March 29, 1960 J. F. BRUNDAGE ET AL 2,930,151
SCOOP ATTACHMENT FOR TRACTORS
Filed Feb. 27, 1957 4 Sheets-Sheet 1

Inventors
John F. Brundage
Donald S. Cleland
Ferdinand M. M. Mirus
by T. Lloyd La Franc
Attorney March 29, 1960     J. F. BRUNDAGE ET AL     2,930,151
SCOOP ATTACHMENT FOR TRACTORS
Filed Feb. 27, 1957     4 Sheets-Sheet 3
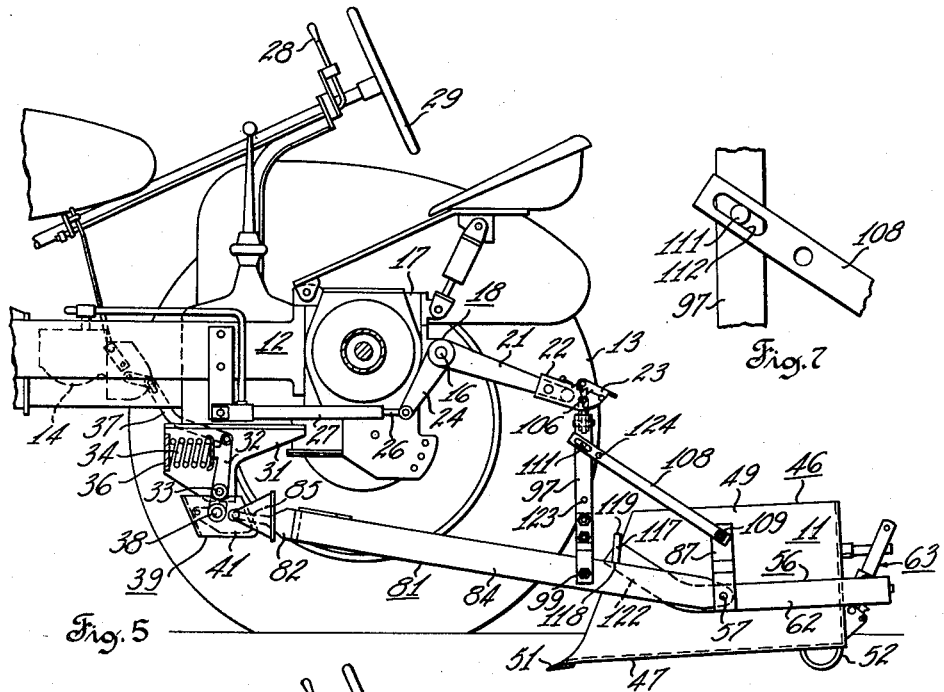
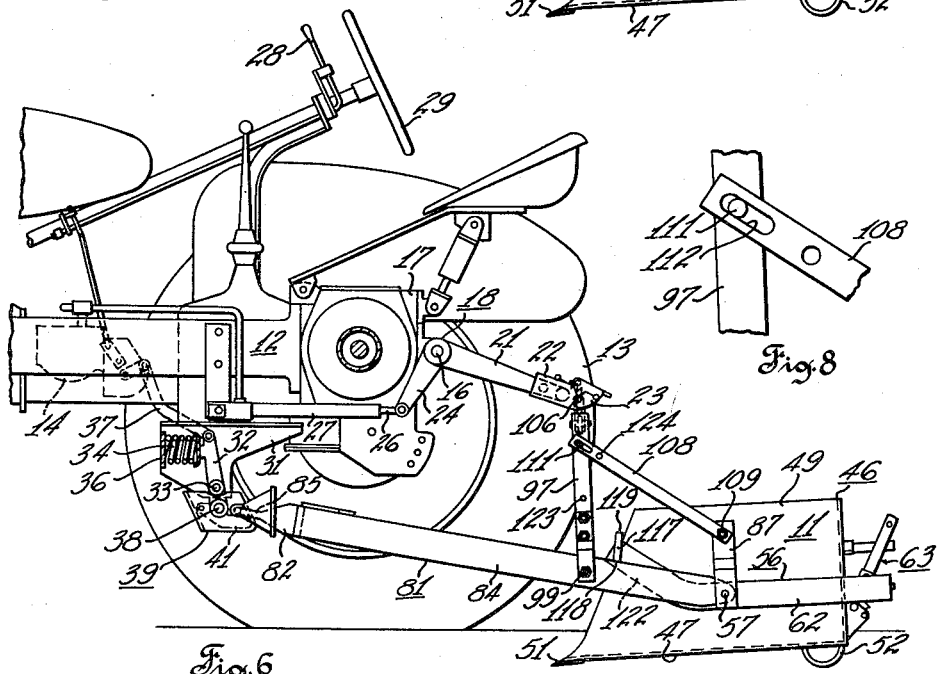
Inventors
John F. Brundage
Donald E. Cleland
Ferdinand M. M. Mivus
By T. Lloyd La Fave
Attorney March 29, 1960 J. F. BRUNDAGE ET AL 2,930,151
SCOOP ATTACHMENT FOR TRACTORS
Filed Feb. 27, 1957 4 Sheets-Sheet 4

Inventors
John F. Brundage
Donald E. Cleland
Ferdinand M. M. Mirus
By T. Lloyd La Faure
Attorney United States Patent Office 2,930,151
Patented Mar. 29, 1960

2,930,151

SCOOP ATTACHMENT FOR TRACTORS

John F. Brundage and Donald E. Cleland, Camarillo, and Ferdinand M. M. Mirus, Ojai, Calif., assignors to Allis-Chalmers Manufacturing Company, Milwaukee, Wis.

Application February 27, 1957, Serial No. 642,791

8 Claims. (Cl. 37—126)

This invention relates to an earth handling scoop and more particularly to such a scoop adapted for mounting on the rear of a tractor provided with a power lift for raising and lowering the scoop.

As heretofore made such tractor mounted scoops comprise a pair of lower links for transmitting draft from the tractor and an upper link for transmitting compression force to the tractor proportional to the draft load. Such linkage has been arranged to provide a backward tilt to the scoop when it is in a raised or transport position and a downward tilt to the scoop when it is in a lowered digging position. This linkage arrangement resulted however in a continuous increase in the downward tilt and digging angle of the scoop between its position when entering the ground and its position at its operating depth. The increasing digging angle resulted in an increasing torque tending to further increase the digging angle of the scoop even at the desired predetermined maximum operating depth for the scoop.

According to the present invention the attachment structure for a tractor mounted scoop has a draft transmitting member that absorbs all reaction torque which tends to rotate the scoop when it is dragged in a digging operation. In digging position the attachment structure is therefore free to swing up and down about the draft transmitting connection on the tractor and the scoop seeks a predetermined maximum operating depth dependent on the line of draft. Unlike structures heretofore employed, the subject attachment structure does not have an upper link that is under compression during draft loading of the scoop.

The upper link employed is essential only for raising and lowering of the scoop when it is connected in draft relation with the tractor.

The attachment structure of this invention operates as a single hitch point linkage in draft loading of the scoop; its draft yoke, moreover, is connected to a resilient hitch member on the tractor that permits fore and aft movement of the scoop relative to the tractor without affecting the digging angle of the scoop.

Reverse mounting of the scoop is provided in that the scoop and attaching structure are constructed and arranged so that the scoop may be detached and remounted in the attaching structure so that the scoop faces either toward or away from the tractor.

It is an object of the present invention to provide a tractor mounted scoop with an attachment structure that operates as a single hitch point linkage when the scoop is drawn by the tractor in a digging operation.

Another object of the invention is to provide a scoop for mounting on the rear of a tractor whose digging angle is not changed upon relative fore and aft movement between the scoop and tractor due to variations in draft load.

Another object of the invention is to provide a scoop attachment adapted for mounting a scoop on the rear of a tractor, which attachment includes a link that controls the tilt of the scoop between ground engaging and transport positions but does not control the tilt of the scoop in digging position when dragged by the tractor.

Another object of the invention is to provide a scoop attachment for mounting a scoop on the rear of a tractor which attachment has a single point draft linkage connection to the tractor and does not have a compression linkage connection to the tractor.

Another object of the invention is to provide a quadrangle linkage for a tractor mounted scoop that controls scoop tilt between predetermined lowered and raised positions with the linkage arranged so that a draft transmitting link absorbs draft reaction torque tending to increase the digging angle of the scoop.

Another object of the invention is to provide a rear mounted tractor scoop that may be selectively mounted in a draft yoke for digging when the tractor is operated either forward or backward.

Another object of the invention is to provide an attachment for a rear mounted tractor scoop which permits down tilt of the scoop in a digging operation and that tilts the scoop backward to at least a level position upon initiating raising and lowering of the scoop.

Other objects and advantages will be apparent to one skilled in the art upon a reading of the following description with the accompanying drawings, in which:

Figs. 3, 4, 5 and 6 are views in elevation on a reduced scale showing the scoop attachment of Fig. 1 mounted on the rear of a tractor with the near rear wheel of the tractor removed; in Fig. 3 the scoop is in a raised transport position; in Fig. 4 the scoop is in a lowered ground supported position; and in Figs. 5 and 6 the scoop is in positions of normal working depth;

Figure 3:
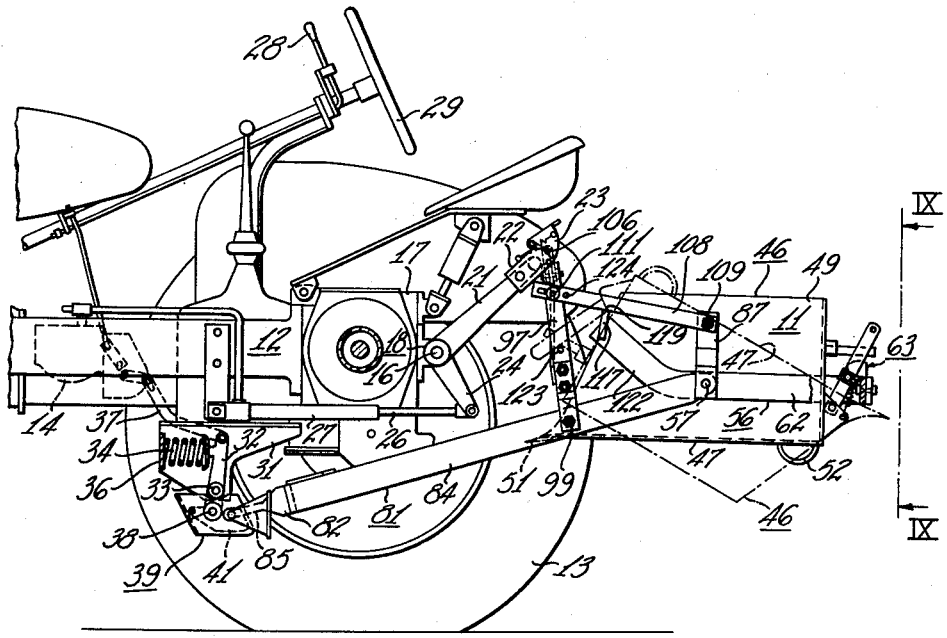
Figure 9:
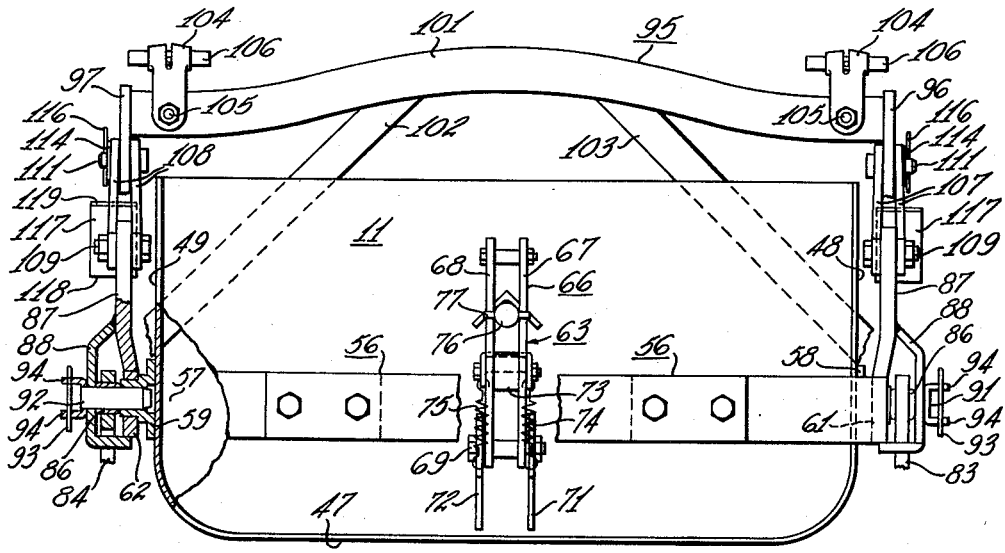
Figure 10:
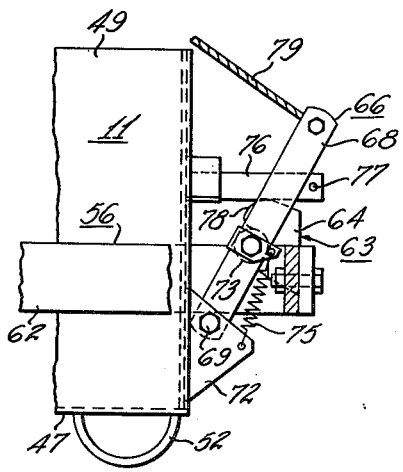

Figs. 7 and 8 are enlarged detail views of connecting portions of suspension links and upper links of the linkage structure for the scoop attachment of Figs. 5 and 6, respectively, showing their relative positions in Figs. 5 and 6 respectively;

Fig. 9 is an enlarged end view of the scoop attachment taken along the line IX—IX in Fig. 3 with portions thereof broken away and in section and showing the latch mechanism on the scoop and scoop frame;

Fig. 10 is a side view of the latch mechanism shown in Fig. 9 with portions broken away and in section.

Figure 1:
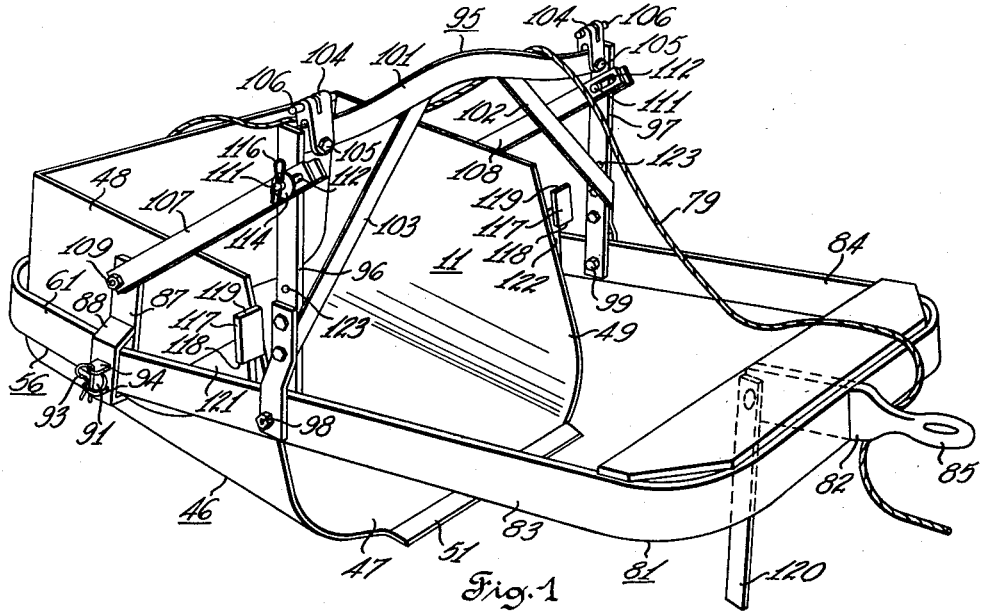
Fig. 1 is a view in perspective of a scoop attachment embodying the present invention.

Referring to the drawings, a scoop attachment 11 shown in Fig. 1 is a completely assembled unit detached from a tractor and is shown in Fig. 3 mounted on the rear portion of a tractor 12. The tractor 12 is of generally conventional construction and comprises rear traction wheels 13 receiving power from an internal combustion engine disposed at a forward portion of the tractor. The engine also provides power for a pump 14 for a draft responsive power lift system of a type heretofore used with farm tractors and disclosed in United States Patent 2,679,-199, issued May 25, 1954, to W. F. Strehlow.

The power lift mechanism includes a rock shaft 16 mounted on a housing 17 of the rear axle of the tractor for rotation on a horizontal, transversely extending axis. The rock shaft 16 is equipped at its opposite ends with bell crank levers 18 having relatively long arms 21 which extend rearwardly and are provided at their free ends with known socket structures 22 having jaws 23 adapted for connection to the rear of the tractor. The relatively short arms 24 of levers 18 are pivotally connected to a piston rod 26 of a hydraulic ram 27 having a barrel end pivotally mounted on the tractor main body. The ram 27 is connected with a pressure fluid supply system which includes pump 14 and a valve control mechanism associated with the pump. A hand lever 28 located near the steering wheel 29 is operative from the tractor seat for manual control of the valve mechanism controlling the power lift system.

The draft responsive mechanism includes a hitch mechanism arranged at the underside of the tractor main body forwardly of the rear axle housing and comprises a bracket 31 rigidly secured to the tractor body, and a rockable hitch lever 32, which is pivotally mounted on the bracket 31 by means of a pivot pin 33 for back and forth swinging movement on a horizontal transverse axis. Movement of lever 32 in response to draft load is opposed by a very strong coil spring 34 interposed between the upper end of lever 32 and an abutment 36 on the bracket 31. A reach link 37 connected to the upper end of lever 32 is operatively connected to an element of the valve control mechanism. A transversely disposed pivot pin 38 at the lower end of lever 32 supports a quick hitch coupler 39 having a funnel shaped housing having an aperture, not shown, in the bottom wall thereof receiving a draft hook 41 which affords a pivot center or draft hitch point for the scoop attachment. Draft hook 41 pivots about the axis of pin 38 which mounts a torsion spring, not shown, that pivotally biases the draft hook into the funnel shaped housing. Draft hook 41 is automatically operable to engage a hitch portion of the scoop attachment and manually operable to disengage it.

Figure 4:
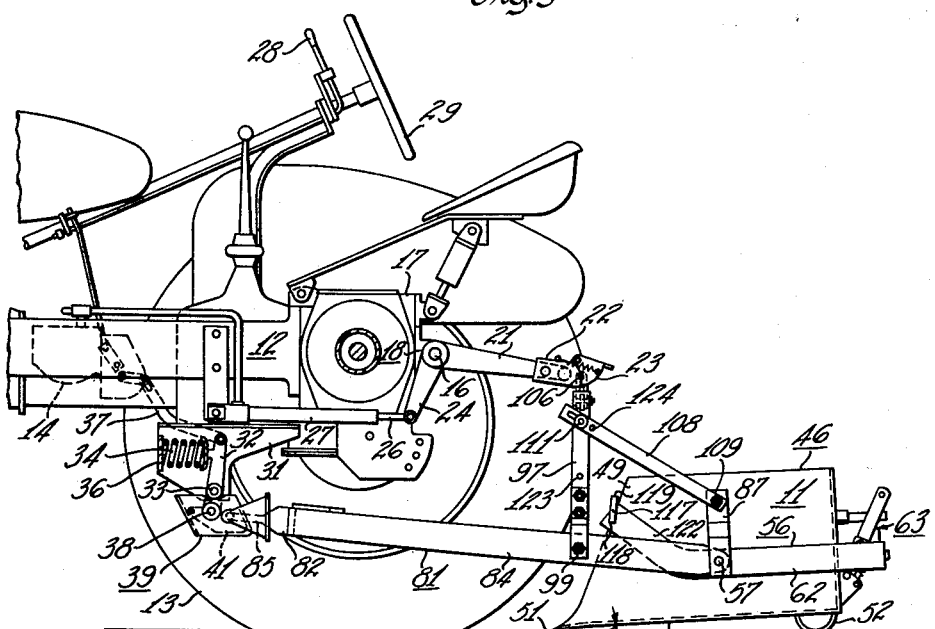

The scoop attachment comprises a scoop or bucket 46 having a bottom 47, and side walls 48 and 49. A forward portion of the bottom of the scoop is bucked downward slightly, Figs. 3 through 6, and a blade 51 is integrally secured thereto as by welding to define a leading cutting edge that is inclined approximately 5 degrees downwardly relative to the general plane of the bottom 47. A runner 52 is a curved piece of bar stock secured to the trailing portion of the bottom 47 to elevate its trailing end relative to the leading edge to facilitate initial entry of the blade into the soil. The runner 52 causes the bottom 47 of the scoop to make an angle of approximately 3 degrees with the surface of the ground when the scoop rests upon the ground as indicated in Fig. 4 so that the blade is at an angle of approximately 8 degrees with the surface of the ground.

An attachment frame 56 for the scoop 46 is U-shaped and surrounds the side and rear walls of the scoop, except when the scoop is in a dump position as indicated by the dot and dash lines in Fig. 3. The scoop 46 is pivatally mounted in the attachment frame 56 by pivot means having a transverse scoop pivot axis 57 and comprising trunnions 58, 59 secured as by welding to the outside of the side walls 48, 49 of the scoop. The axis of trunnions 58, 59 is positioned near the lower portion of the scoop and between the center of gravity of the scoop and the leading edge of the scoop so that the scoop when empty tends to tilt downward and backward into the latched position.

The trunnions 58, 59 are journaled in legs 61, 62 of the attachment frame as better seen in the sectional views shown in Fig. 9.

Means securing the scoop against rotation in the attachment frame is a latch device 63, Fig. 10, comprising a fixed hook 64 mounted on the attachment frame 56. The fixed hook 64 is detachably engaged by a movable latch 66 which comprises a pair of laterally spaced members 67, 68 pivotally secured by a bolt 69 to spaced brackets 71, 72 welded to the back of the scoop. A roller 73 is pinned between the latch members and detachably engages the hook 64 upon rotation of the movable latch 66 about the axis of bolt 69 in a direction away from the hook. Tension springs 74, 75 are secured to brackets 71, 72 and to the latch members 67, 68 at points spaced from a line between bolt 69 and roller 73 to urge the latch members toward hook 64. A stop 76 is mounted on the back of the scoop and extends between the spaced latch members 67, 68. The stop 76 is provided with a pin 77 which limits the rotation of the latch in a direction away from the back of the scoop thereby aligning the latch roller 73 for engagement with a cam surface 78 of the hook 64. The stop 76 also strikes the top of hook 64 to prevent further rotation of the scoop, clockwise in Figs. 3 and 10, after it is in position for engagement of the hook 64 and latch roller 73. A trip rope 79 is connected to the upper end of movable latch 66 and the rope is positioned to be within easy reach of the tractor operator from his station on the tractor for manually tripping the latch by a pull upon the rope.

The scoop attachment includes a draft transmitting yoke 81 or drawbar frame having a forward hitch portion 82 and trailing laterally spaced side arms 83, 84. The hitch portion 82 is provided with an eye 85 for detachably receiving the hitch point or draft hook 41 on the tractor, which eye and hook cooperate to provide a pivot center for vertical swinging movement of the scoop attachment relative to the tractor.

The trailing end portions of the side arms 83, 84 of the draft yoke are provided with axially aligned bearings 86 having a transverse axis, as shown in Fig. 9. Rigid upright members 87 extend from the side arms 61, 62 of the attachment frame 56 and each upright member 87 has a depending portion 88 spaced laterally of its frame arm. Each of these depending portions 88 has a trunnion pin receiving aperture in axial alignment with trunnion bearings provided by the side arms 61, 62 which are mounted on trunnions 58, 59. Trunnion pins 91, 92 extend through the apertures in the depending portions 88, through the bearings 86 in the draft yoke and extend into bores in the trunnions 58, 59 so that the trunnion pins support the draft yoke for pivotal movement relative to the attachment frame about the pivot axis of relative pivotal movement of the attachment frame and scoop.

The trunnion pins 91, 92 are secured in position, Fig. 1, by suitable means such as cotter pins 93 that extend through flanges 94 secured to the depending members 88 in overlying relation to the heads of the trunnion pins. These flanges also abut flat sided surfaces of the trunnion pins to prevent rotation of the trunnion pins relative to the attachment frame.

A lift frame or hanger structure 95 is provided for the scoop attachment, so that it may be raised and lowered by the tractor power lift arms 21, and comprises lift transmitting side portions 96, 97 attached by pivot connections 98, 99 to the side arms of the draft yoke. The pivot connections 98, 99 have a transverse axis spaced forwardly of the pivot bearings in the trailing ends of the yoke. A rigid cross member 101 is secured as by welding to the upper ends of the side portions of the hanger structure. Diagonal braces 102, 103 between the cross member 101 and the hanger side portions 96, 97 make the hanger structure laterally very rigid. Suitable coupling means for the hanger structure for connection to the socket structure of the tractor lift arms comprises a pair of laterally spaced knuckle pieces 104 which are pivotally connected to the cross member by bolts 105. Latch pins 106 are secured in the knuckle pieces and are adapted to be detachably coupled to the jaws 23 of the socket members on the tractor power lift arms.

Link means or tilt control means, comprising an extensible and contractible connecting structure is operatively interposed between the attachment frame 56 and the hanger structure 95 to control the pivotally adjusted position of the attachment frame relative to the position of the draft yoke. Such link means comprise upright members 87, longitudinally rigid top links 107, 108, containing elongated slots or apertures 112, and detachable pins or bolts 111 received in said slots. Each top link 107, 108 includes a pair of straps. Top links 107, 108 are pivotally secured at one end to the upper portions of the upright members 87 by bolts 109 having a transverse axis spaced from the pivot axis 57 of the scoop. The other ends of the top links are pivotally secured by said detachable pins or bolts 111 extending through said elongated slots or apertures 112 in the link straps and through bores 113 in the upper portions of the lift transmitting side portions of the hanger structure. Bolts 111 provide a transverse axis spaced vertically of the transverse pivot axis of bolts 98, 99. The bolts 111 have heads disposed on the inside or scoop side of the hanger structure. Washers 114 and detachable locking pins 116 secure the bolts 111 on the outside of the hanger structure. The elongated apertures 112 in the top links provide a lost motion connection permitting longitudinal movement of the links on bolts 111 for limited pivotal movement of the attachment frame relative to the draft yoke and hanger structure. Also, limited pivotal movement of the attachment frame 56 relative to the draft yoke 81 is provided by stop means comprising laterally extending abutment elements 117 secured to extended portions 121, 122 of legs 61, 62 of the attachment frame 56. Such extended portions curve upward and serve as torque arms that have abutment elements 117 which present first stop surfaces 118 that will abut the side arms of the draft yoke, Fig. 6, upon predetermined downward swinging movement of the attachment frame relative to the draft yoke. The abutment elements 117 present second stop surfaces 119 that will abut the top links, Fig. 3, upon predetermined upward swinging movement of the attachment frame relative to the draft yoke. The function of this stop means and of the lost motion connecting means is further described in the following description of the operation of the scoop attachment.

The stand 120 supports the draft yoke of the scoop attachment, Fig. 1, to facilitate its connection to the quick coupler hitch on the tractor. The stand 120 is pivotally connected to the hitch portion of the draft yoke and is pivoted rearward and out of the way when the scoop attachment is coupled to the tractor.

The scoop attachment described provides built-in linkages that make the unit self-contained so that when coupled to the single draft transmitting connection 41 on the tractor and when connected to the tractor power lift arms 21, the tilt of the scoop 46 relative to the draft yoke 81 is automatically controlled by such built-in structure without requiring an additional link connection to the tractor.

In the position shown in Fig. 3, the scoop 46 is in a transport position for either a loaded or an empty scoop, and in this position the scoop may be tripped by a pull on the trip rope 79 to both release the latch means 63 and assist in rotating the scoop in its attachment frame 56 to the dump position indicated by the dot and dash lines in Fig. 3.

In such tripped and dump position the scoop rotates about 135 degrees about its pivot axis, counterclockwise in Fig. 3, until the bottom of the scoop abuts the underside of the trailing portion of the attachment frame 56. When lowered and dragged in this dump position the scoop is in torque transmitting engagement with the hanger structure and is useful for spreading the loose soil.

In the raised or transport position, the scoop and attachment frame could pivotally rock in the draft yoke 81 to the extent of the lost motion provided in the top link connections, but such rocking movement is prevented by the frictional engagement of the top links 107, 108 with the surfaces 119 of stop abutments 117 on the torque arms 121, 122 of the attachment frame 56.

The scoop is shaped so that when it carries a normal load the center of gravity of the loaded scoop is forward of its pivot axis thus tending to tilt the front end of the scoop downward. However, when the scoop is not fully loaded or when more load is carried by the rear portion, then the center of gravity of the loaded scoop remains rearward of the scoop pivot axis, tending to tilt the rear of the scoop downward, as is the case when the scoop is empty.

The scoop bottom 47 is held substantially level between raised and lowered positions, Figs. 3 and 4, due to the construction and arrangement of the built-in linkage structure relative to the movements of the draft yoke and the tractor lift arms.

In Fig. 4 the scoop is lowered and rests freely on the ground. The power lift arms 21 are free floating, permitting upward and downward swinging movement of the scoop attachment about its pivot center on the tractor. Supported by runner 52 the scoop bottom is inclined to approximately 3 degrees with the surface of the ground to provide a cutting or suck angle for the leading edge of the scoop to aid its entrance into the soil as the scoop is dragged by the tractor.

The entrance angle for the scoop causes the scoop to quickly enter the soil. Upon initial entry of the scoop the digging angle increases until the bottom of the scoop makes an angle of about 6 degrees with the level of the ground and further increase is prevented by the torque arms 121, 122. Thereafter the digging angle of the scoop decreases with further lowering of the scoop upon downward swinging movement of the scoop attachment about its hitch point on the tractor. At maximum operating depth the scoop bottom again makes an angle of about 3 degrees with the ground level. The normal or predetermined maximum operating depth for the scoop varies somewhat with different soil conditions and is determined by the line of draft for the scoop. Such self-determined operating depth occurs where the opposing vertical forces acting on the scoop are balanced. For the scoop attachment and tractor shown the operating depth for average soil conditions is at about four inches, and the effective line of draft is coincident with the draft yoke on a line between the draft hitch point at hook 41 and the scoop pivot axis 57 representing the center of resistance of the scoop. At the normal operating depth the scoop moves in parallelism with the level of the ground, with the torque arm stops 117 moving into and out of the abutment with the draft yoke, and with the pin and slot connections for the top links operating in a free floating manner, wherein the bolts or pins 111 are positioned intermediate the ends of the slots 112, as shown in Figs. 5 through 8.

An increase in draft load, Fig. 6, causes the tractor hitch lever 32 to pivot to compress spring 34 and operate the draft responsive mechanism, and causes the draft yoke to move backward relative to the tractor. This results in the top links sliding backward relative on pins 111 of the pin and slot connections with the hanger structure. The position of the pins 111 in their slots 112 before and after an increase in the draft load is illustrated in Figs. 7 and 8, respectively, which correspond to the draft load positions shown in Figs. 5 and 6, respectively. Similarly, a decrease in draft load would cause relative fore and aft movement of the scoop and tractor, and such fore and aft movements due to variations in draft load are thus taken up by the lost motion provided in the top link means so that tilt of the scoop is not affected thereby.

The tractor power lift arms 21, in response to the draft control mechanism, apply lift to the scoop attachment to transfer weight from the scoop to the rear wheels of the tractor. A predetermined increase in the draft load causes the control mechanism to operate the lift arms to raise the scoop for decreasing its operating depth until the draft loading returns to normal. In draft loading, it is apparent that the draft yoke, attachment frame and scoop operate as a unit that can move backward relative to the tractor without rotating the scoop and effectively the scoop attachment operates in the same manner as it would operate with the top links omitted.

Upon upward swinging of the scoop attachment about the hitch point on the tractor, by means of the power lift system, the linkage including the hanger structure 95 and top links 107, 108 cooperate with the linkage defined by the power lift arms 21 and the draft yoke 81 to initially tilt the scoop 46 backward and then to hold it substantially level. A loaded scoop may have a center of gravity forward of the scoop pivot axis and tilt the scoop forward so that pins 111 are positioned in the back of slots 112 as in the position shown in Fig. 3.

Figure 2:
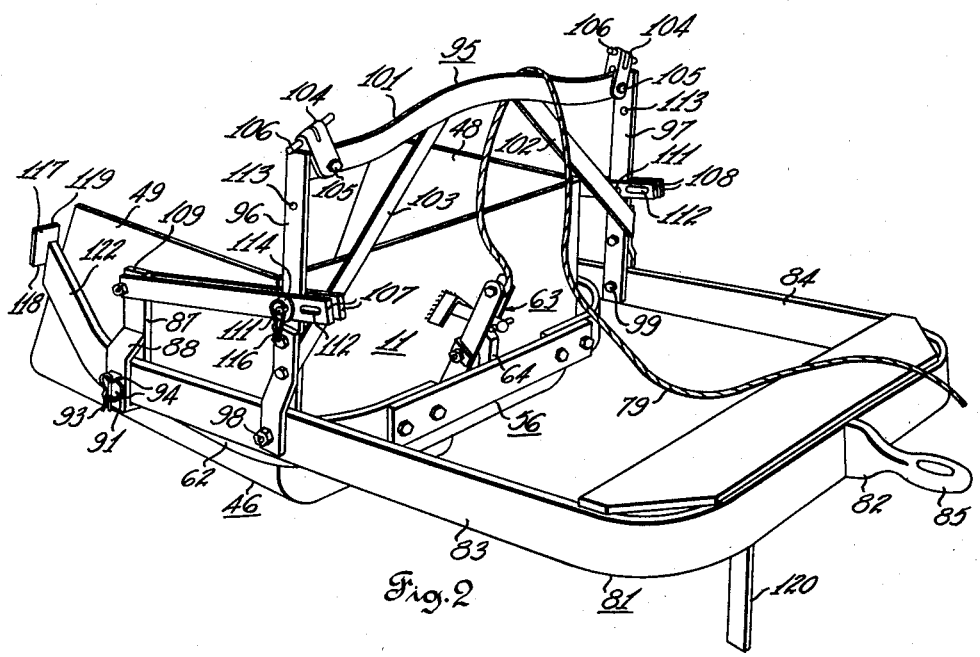
Fig. 2 is a view of the scoop attachment, like that of Fig. 1, but showing the scoop reversely mounted in a draft yoke.

The scoop attachment is also constructed and arranged for reverse mounting of the scoop and attachment frame within the draft yoke and hanger structure, as shown in Fig. 2, for loading of the scoop upon rearward travel of the tractor. With the scoop reversed, the top links 107, 108 are pivotally connected by detachable pins or bolts 111 extending through holes 123 (Fig. 1) in the side portions of the hanger structure 95, below holes 113, and through holes 124 (Fig. 3) in the top links. This connection does not provide lost motion controlling the tilt of the scoop.

The draft yoke 81, when the scoop is mounted for rearward operation, serves as a thrust transmitting member in loading the scoop. And the scoop when so mounted and lowered may be dragged by forward travel of the tractor, with the scoop in latched position, to serve effectively as a spreader for loose uneven soil.

It will be apparent from the description of the structure of the scoop attachment for a tractor that a simple and economical structure is provided that permits selective mounting of the scoop within a draft and thrust transmitting framework for forward digging and for reversed digging or spreading, and that various changes may be made in the embodiments shown and described without departing from the spirit of the invention or from the scope of the appended claims.

What is claimed is:

1. In a scoop attachment for tractors comprising, in combination, a yoke serving as a draft or a thrust transmitting member and having a hitch portion cooperable with a tractor so as to afford a pivot center on which said yoke may swing upwardly into a transport position and downwardly into a working position; an attachment frame having opposite side portions pivoted on a first axis transverse to opposite side portions, respectively, of said yoke so as to afford a pivot center on which said attachment frame may swing into downwardly and upwardly tilted positions of adjustment relative to said yoke; a hanger structure having opposite side portions pivotally connected on a second transverse axis with said opposite side portions, respectively, of said yoke; coupling means connected to said hanger structure and detachably connecting the latter in lift force transmitting relation with an up and down swingable power lift member on said tractor, a scoop operatively mounted on said attachment frame, to pivot about said first axis for pivotal movement in unison with said attachment frame relative to said yoke; and link means interconnecting said attachment frame and said hanger structure to position said attachment frame relative to said draft yoke, said link means being connected to said attachment frame at said first axis.

2. A scoop attachment for tractors comprising, in combination, a yoke serving as a draft member and having a hitch portion cooperable with a tractor so as to afford a pivot center on which said yoke may swing upwardly into a transport position and downwardly into a working position; an attachment frame having opposite side portions hingedly connected with opposite side portions, respectively, of said yoke so as to afford a pivot center on which said attachment frame may swing into downwardly and upwardly tilted positions of adjustment relative to said yoke; a hanger structure having opposite side portions pivotally connected on a transverse axis with said opposite side portions, respectively, of said yoke; coupling means operatively associated with said hanger structure for detachably connecting the latter in lift force transmitting relation with an up and down swingable power lift member on said tractor, a scoop operatively mounted on said attachment frame for pivotal movement in unison therewith relative to said yoke; and link means operatively interposed between said attachment frame and said hanger structure to control the pivotally adjusted position of said attachment frame relative to said draft yoke in said transport position and said link means providing a lost motion connection that is in a free floating position when said draft yoke and scoop are in said working position.

3. A scoop attachment as set forth in claim 2 in which said yoke, when in lowered position and serving as a draft transmitting member, has a portion cooperating with a portion of said frame to provide a limit to the downward tilting movement of said frame relative to said draft yoke to thereby limit the maximum operating depth of said scoop.

4. A scoop attachment as set forth in claim 2 and further comprising a torque arm secured to said attachment frame and cooperable with said draft yoke to limit said downward swinging movement of said attachment frame and thereby determine a limiting downwardly tilted position of the latter upon movement of said draft yoke into said working position.

5. A scoop attachment as set forth in claim 2 in which said attachment frame includes an abutment element cooperable with said link means to secure said attachment frame against upward tilting movement beyond said upwardly tilted position thereof upon movement of said draft yoke into said transport position.

6. A scoop attachment as set forth in claim 2 and further comprising abutment means secured to said attachment frame and presenting a first stop face cooperable with said draft yoke so as to limit said downward tilting movement of said attachment frame relative to said draft yoke upon movement of said draft yoke into said working position; said abutment means presenting a second stop surface cooperable with said lost motion connecting means so as to secure said attachment frame against upward tilting movement beyond said upward tilted position thereof upon movement of said draft yoke into said transport position.

7. A scoop attachment for tractors comprising, in combination, a yoke serving as a draft or a thrust transmitting member and having a hitch portion cooperable with a tractor so as to afford a pivot center on which said yoke may swing upwardly into a transport position and downwardly into a working position; an attachment frame having opposite side portions hingedly connected with opposite side portions, respectively, of said yoke so as to afford a pivot center on which said attachment frame may swing into downwardly and upwardly tilted positions of adjustment relative to said yoke; a hanger structure having opposite side portions pivotally connected on a transverse axis with said opposite side portions, respectively, of said yoke; coupling means operatively associated with said hanger structure for detachably connecting the latter in lift force transmitting relation with an up and down swingable power lift member on said tractor, a scoop operatively mounted on said attachment frame for pivotal movement in unison therewith relative to said yoke; and link means operatively interposed between said attachment frame and said hanger structure so as to control the pivotally adjusted position of said attachment frame relative to said draft yoke, said frame having a portion movable into abutment with said link means and thereby limiting upward tilting movement of said draft frame when said draft yoke is in transport position.

8. A scoop attachment for tractors comprising, in combination, a yoke serving as a draft or a thrust transmitting member and having a hitch portion cooperable with a tractor so as to afford a pivot center on which said yoke may swing upwardly into a transport position and downwardly into a working position; an attachment frame having opposite side portions hingedly connected with opposite side portions, respectively, of said yoke so as to afford a pivot center on which said attachment frame may swing into downwardly and upwardly tilted positions of adjustment relative to said yoke; a hanger structure having opposite side portions pivotally connected on a transverse axis with said opposite side portions, respectively, of said yoke; coupling means operatively associated with said hanger structure for detachably connecting the latter in lift force transmitting relation with an up and down swingable power lift member on said tractor, a scoop, pivot means operatively mounting said scoop on said attachment frame for turning movement relative thereto on a transverse axis, and releasable locking means operatively interposed between said scoop and attachment frame for securing said scoop in a predetermined position of rotary adjustment relative to said attachment frame, said scoop and said attachment frame having surface portions, respectively, in such relation to each other that said scoop surface portion will be brought into torque transmitting engagement with said frame surface portion upon rotation of said scoop from said predetermined position thereof through substantially a half revolution; and link means operatively interposed between said attachment frame and said hanger structure so as to control the pivotally adjusted position of said attachment frame relative to said draft yoke.

References Cited in the file of this patent

UNITED STATES PATENTS

| | | |
|---|---|---|
| 2,273,875 | Livesey et al. | Feb. 24, 1942 |
| 2,390,040 | Arps | Dec. 4, 1945 |
| 2,597,692 | Wills et al. | May 20, 1952 |
| 2,662,783 | Sawyer | Dec. 15, 1953 |
| 2,679,199 | Strehlow | May 25, 1954 |